United States Patent
Damour et al.

(10) Patent No.: US 12,255,895 B2
(45) Date of Patent: Mar. 18, 2025

(54) EFFICIENT ATTRIBUTE-BASED ACCESS CONTROL AUTHORIZATION FOR A MESSAGE BROKER

(71) Applicant: Microsoft Technology Licensing, LLC, Redmond, WA (US)

(72) Inventors: Kevin Thomas Damour, Redmond, WA (US); David Michael Sauntry, Redmond, WA (US); Peter Gregg Miller, Seattle, WA (US); Jeroen Vanturennout, Snohomish, WA (US); Murli Dharan Satagopan, Kirkland, WA (US); William Alexander Stevenson, Seattle, WA (US); Michael Richard Yagley, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 17/828,713

(22) Filed: May 31, 2022

(65) Prior Publication Data
US 2023/0336547 A1    Oct. 19, 2023

Related U.S. Application Data

(60) Provisional application No. 63/330,982, filed on Apr. 14, 2022.

(51) Int. Cl.
*H04L 9/40* (2022.01)
*G16Y 40/50* (2020.01)

(52) U.S. Cl.
CPC .......... *H04L 63/0876* (2013.01); *G16Y 40/50* (2020.01)

(58) Field of Classification Search
CPC .............. H04L 63/0876; G16Y 40/50
See application file for complete search history.

(56) References Cited

U.S. PATENT DOCUMENTS

6,158,007 A * 12/2000 Moreh ............ H04L 63/20 726/1
11,811,884 B1 * 11/2023 Gochenaur .......... H04L 67/562
(Continued)

FOREIGN PATENT DOCUMENTS

EP    1043671 A2    10/2000

OTHER PUBLICATIONS

"Non Final Office Action Issued in U.S. Appl. No. 17/828,723", Mailed Date: Mar. 30, 2023, 16 Pages.
(Continued)

*Primary Examiner* — Jimmy H Tran
(74) *Attorney, Agent, or Firm* — Workman Nydegger

(57) ABSTRACT

Methods, systems, apparatuses, and computer-readable storage mediums are described for authorizing publishing of a message and/or a subscription from an Internet of Things (IoT) device. In an example system, a message broker receives a list of attributes from a claims provider. The message broker determines whether publishing of the message is authorized based at least on the list of attributes, and publishes the message if it is determined that the publishing is authorized. The message broker may also receive a subscription specifying a topic filter. The message broker determines whether the subscription is authorized for the IoT device based at least on the list of attributes, and transmits a subscription message to the IoT device if it is determined that the subscription is authorized.

18 Claims, 5 Drawing Sheets

(56) References Cited

U.S. PATENT DOCUMENTS

| | | | |
|---|---|---|---|
| 2003/0135556 A1* | 7/2003 | Holdsworth | H04L 9/40 709/206 |
| 2006/0056628 A1* | 3/2006 | Todd | H04L 67/55 380/233 |
| 2008/0294794 A1* | 11/2008 | Darugar | H04L 67/63 709/238 |
| 2009/0006559 A1* | 1/2009 | Bhogal | H04L 12/1818 709/206 |
| 2009/0006560 A1* | 1/2009 | Bhogal | G06Q 10/107 709/206 |
| 2009/0138572 A1* | 5/2009 | Banks | H04L 67/306 709/218 |
| 2009/0177753 A1* | 7/2009 | Banks | G06Q 10/10 709/206 |
| 2009/0182574 A1* | 7/2009 | Beardall | G06Q 10/06 705/1.1 |
| 2011/0047595 A1* | 2/2011 | Diep | H04L 63/0884 726/3 |
| 2015/0207857 A1* | 7/2015 | Horton | H04L 67/51 709/204 |
| 2015/0294377 A1* | 10/2015 | Chow | G06Q 30/0263 705/347 |
| 2016/0094649 A1* | 3/2016 | Dornquast | G06F 16/182 709/227 |
| 2016/0112438 A1* | 4/2016 | Hengstler | H04L 63/102 726/4 |
| 2017/0093857 A1* | 3/2017 | Hinohara | H04L 63/0876 |
| 2017/0126603 A1* | 5/2017 | Chen | H04L 51/214 |
| 2018/0167476 A1* | 6/2018 | Hoffner | H04L 67/55 |
| 2018/0183748 A1* | 6/2018 | Zhang | H04L 67/53 |
| 2018/0316641 A1* | 11/2018 | Mankovskii | H04L 67/12 |
| 2019/0109805 A1* | 4/2019 | Gallant | G06Q 10/107 |
| 2019/0132276 A1* | 5/2019 | Scheiber | H04L 67/12 |
| 2019/0268429 A1* | 8/2019 | Dresselhaus | H04L 67/562 |
| 2019/0273790 A1 | 9/2019 | Zhao | |
| 2019/0289091 A1* | 9/2019 | Burns | H04L 67/562 |
| 2020/0067903 A1* | 2/2020 | Yegorin | H04L 67/562 |
| 2022/0014594 A1* | 1/2022 | Mladin | H04W 4/70 |
| 2022/0109676 A1* | 4/2022 | Balmakhtar | A63F 13/792 |
| 2022/0191018 A1* | 6/2022 | Giblin | H04L 9/0894 |
| 2023/0142108 A1* | 5/2023 | Iyer | G06F 9/542 719/314 |
| 2023/0336509 A1 | 10/2023 | Miller et al. | |
| 2023/0336510 A1* | 10/2023 | Miller | H04L 51/212 |

OTHER PUBLICATIONS

Coulouris, et al., "Distributed Systems: Concepts and Design (5th Edition)", in Publication of Addison Wesley, Fifth Addition, May 7, 2011, 632 Pages.

"International Search Report and Written Opinion Issued in PCT Application No. PCT/US23/011798", Mailed Date: May 10, 2023, 15 Pages.

"International Search Report and Written Opinion Issued in PCT Application No. PCT/US23/011805", Mailed Date: Apr. 20, 2023, 13 Pages.

Thean, et al., "Container-based MQTT Broker Cluster for Edge Computing", in Proceedings of 4th International Conference and Workshops on Recent Advances and Innovations in Engineering, Nov. 27, 2019, 6 Pages.

"Final Office Action Issued in U.S. Appl. No. 17/828,715", Mailed Date: Sep. 22, 2023, 19 Pages.

"Non Final Office Action Issued in U.S. Appl. No. 17/828,715", Mailed Date: Jun. 6, 2023, 16 Pages.

"International Search Report and Written Opinion Issued in PCT Application No. PCT/US23/011799", Mailed Date: May 24, 2023, 13 Pages.

"International Search Report and Written Opinion Issued in PCT Application No. PCT/US23/011803", Mailed Date: Jun. 9, 2023, 13 Pages.

"Non Final Office Action Issued in U.S. Appl. No. 17/828,718", Mailed Date: Mar. 3, 2023, 12 Pages.

Final Office Action mailed on Nov. 20, 2023, in U.S. Appl. No. 17/828,723, 21 pages.

Notice of Allowance mailed on Feb. 5, 2024, in U.S. Appl. No. 17/828,715, 12 pages.

Notice of Allowance mailed on Feb. 26, 2024, in U.S. Appl. No. 17/828,715, 5 pages.

U.S. Appl. No. 63/330,982, filed Apr. 14, 2022.
U.S. Appl. No. 63/331,010, filed Apr. 14, 2022.
Non-Final Office Action mailed on Mar. 19, 2024, in U.S. Appl. No. 17/828,723, 21 pages.
U.S. Appl. No. 63/330,992, filed Apr. 14, 2022.
U.S. Appl. No. 63/331,000, filed Apr. 14, 2022.
U.S. Appl. No. 17/828,715, filed May 31, 2022.
U.S. Appl. No. 17/828,718, filed May 31, 2022.
U.S. Appl. No. 17/828,723, filed May 31, 2022.
Final Office Action mailed on Jun. 11, 2024, in U.S. Appl. No. 17/828,723, 22 pages.

* cited by examiner

300

Reject the message for publication if publishing of the message is not authorized based at least on the received list of attributes and the topic — 302

Receive the list of attributes from a wrapper that obtains the list of attributes from the claims provider — 402

FIG. 4

EFFICIENT ATTRIBUTE-BASED ACCESS CONTROL AUTHORIZATION FOR A MESSAGE BROKER

CROSS-REFERENCE TO RELATED APPLICATIONS

This application claims priority to provisional U.S. Patent Application No. 63/330,982, filed Apr. 14, 2022, entitled "Efficient Attribute-Based Access Control Authorization for a Message Broker," the entirety of which is incorporated by reference herein.

BACKGROUND

In certain types of messaging environments, client devices can be a publisher or a subscriber, or both, of messages of a given topic. In such environments, a client device sending a message (e.g., a publisher) publishes a message to a topic. The message is received by a message broker responsible for determining which subscribers should receive the message and routing the message to those subscribers. In this manner, once a publisher publishes a message to the topic, subscribers of a topic filter that includes that topic receive the message through the broker.

With these messaging environments becoming commonplace, the number of client devices communicating in these environments have increased. Efficiently managing the influx of the messages and the appropriate routing by the message broker becomes more difficult as the number of messages and topics continue to increase. As a result, messages may be routed incorrectly and/or inefficiently, resulting in a poor overall performance of publish/subscribe messaging systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for authorizing publishing of a message from an Internet of Things (IoT) device. In an example system, a message broker receives the message from the IoT device for publishing to a topic. The message broker receives a list of attributes relating to the IoT device from a claims provider. The message broker determines whether publishing of the message is authorized based at least on the received list of attributes and the topic. If the publishing of the message is authorized based at least on the received list of attributes and the topic, the message broker publishes the message to the topic.

Methods, systems, apparatuses, and computer-readable storage mediums are also described for authorizing a subscription by an IoT device. In an example system, a message broker receives the subscription from the IoT device, where the subscription specifies a topic filter. The message broker receives a list of attributes relating to the IoT device from a claims provider. The message broker determines whether the subscription specifying the topic filter is authorized for the IoT device based at least on the received list of attributes and the topic filter. If the subscription specifying the topic filter is authorized for the IoT device, the message broker transmits one or messages within the scope of the topic filter to the IoT device.

Methods, systems, apparatuses, and computer-readable storage mediums are also described for authorizing the transmission of messages involving an IoT device. In an example system, a message broker receives, from the IoT device, a first message for publishing to a topic. The message broker determines whether publishing of the first message is authorized based at least on the topic and a list of attributes relating to the IoT device received from a claims provider. If the publishing of the message is authorized based at least on the topic and the list of attributes, the message broker publishes the first message to the topic. The message broker also receives, from the IoT device, a subscription which specifies a topic filter. The message broker determines whether the subscription specifying the topic filter is authorized for the IoT device based at least on the topic filter and the list of attributes. If the subscription specifying the topic filter is authorized for the IoT device, the message broker transmits a second message within the scope of the topic filter to the IoT device.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a flowchart of a method for rejecting a message for publication, in accordance with an example embodiment.

FIG. 4 shows a flowchart of a method for receiving a list of attributes from a wrapper, in accordance with an example embodiment.

Figure 1:
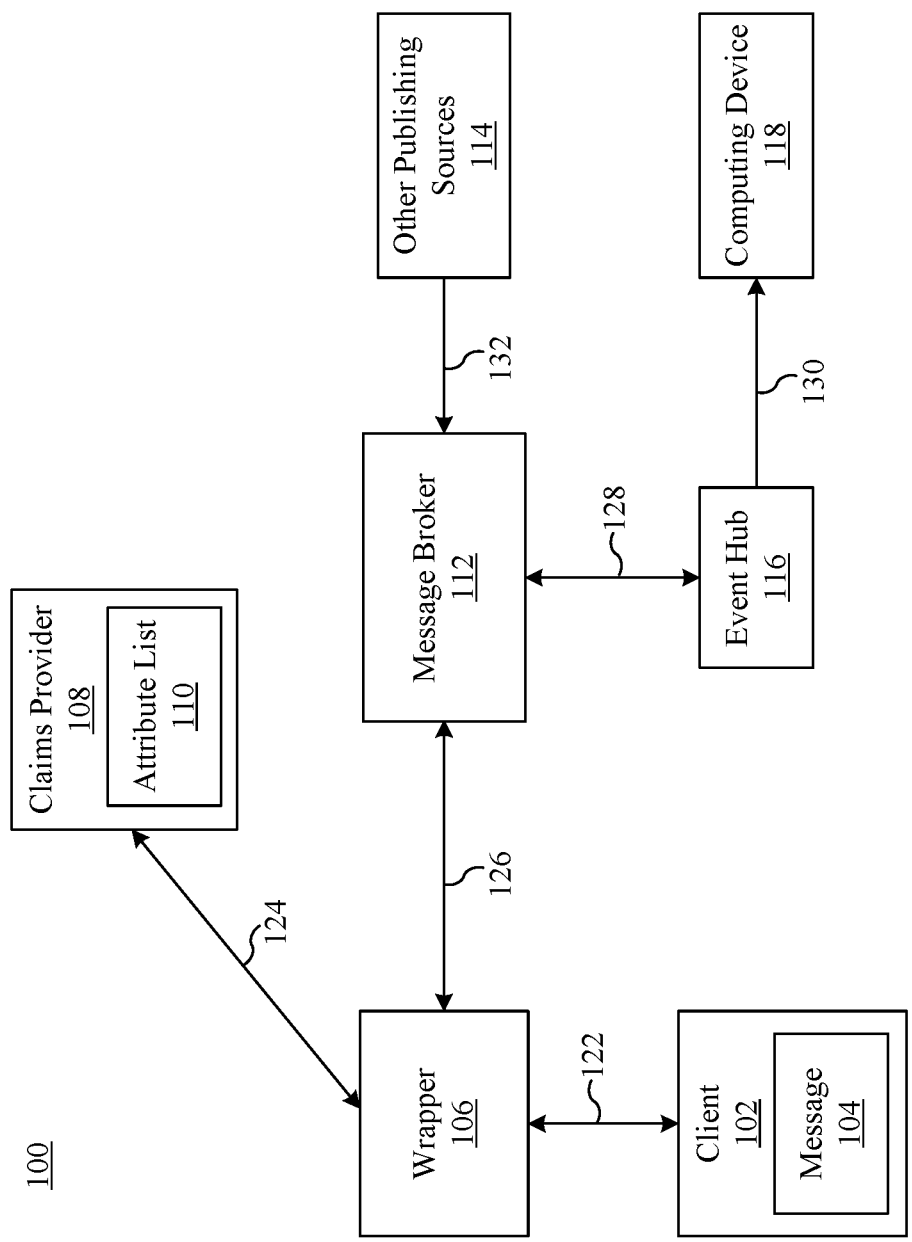
FIG. 1 shows a block diagram of an example attribute based access control authorization system for a message broker, in accordance with an example embodiment.

The features and advantages of the embodiments described herein will become more apparent from the detailed description set forth below when taken in conjunction with the drawings. The drawing in which an element

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

In certain types of messaging environments, client devices can be a publisher or a subscriber, or both, of messages of a given topic. In such environments, a client device sending a message (e.g., a publisher) publishes a message to a topic. The message is received by a message broker responsible for determining which subscribers should receive the message and routing the message to those subscribers. In this manner, once a publisher publishes a message to the topic, subscribers of a topic filter that includes that topic receive the message through the broker.

With these messaging environments becoming commonplace, the number of client devices communicating in these environments have increased. Efficiently managing the influx of the messages and the appropriate routing by the message broker becomes more difficult as the number of messages and topics continue to increase. As a result, messages may be routed incorrectly and/or inefficiently, resulting in a poor overall performance of publish/subscribe messaging systems.

Embodiments described herein address these issues in numerous ways. In one example system, a message broker receives the message from the IoT device for publishing to a topic. The message broker receives a list of attributes relating to the IoT device from a claims provider. The message broker determines whether publishing of the message is authorized based at least on the received list of attributes and the topic. If the publishing of the message is authorized based at least on the received list of attributes and the topic, the message broker publishes the message to the topic.

In another example system, a message broker receives the subscription from the IoT device, where the subscription specifies a topic filter. The message broker receives a list of attributes relating to the IoT device from a claims provider. The message broker determines whether the subscription specifying the topic filter is authorized for the IoT device based at least on the received list of attributes and the topic filter. If the subscription specifying the topic filter is authorized for the IoT device, the message broker transmits one or messages within the scope of the topic filter to the IoT device.

In yet another example system, a message broker receives, from the IoT device, a first message for publishing to a topic. The message broker determines whether publishing of the first message is authorized based at least on the topic and a list of attributes relating to the IoT device received from a claims provider. If the publishing of the message is authorized based at least on the topic and the list of attributes, the message broker publishes the first message to the topic. The message broker also receives, from the IoT device, a subscription which specifies a topic filter. The message broker determines whether the subscription specifying the topic filter is authorized for the IoT device based at least on the topic filter and the list of attributes. If the subscription specifying the topic filter is authorized for the IoT device, the message broker transmits a second message within the scope of the topic filter to the IoT device.

In yet another example system, a per message authorization access check is provided across topics of a messaging environment. A broker receives an incoming message from a device. The broker executes one or more validation steps on the message. One such validation step is to obtain a list of attributes associated with the device and a possible user identity associated with the message. The attributes may include a list of topics for which messages are authorized to publish to or subscribe. An access check is performed on the incoming message by extracting the topic specified in the incoming message and determining if the topic is an allowed topic provided in the attribute list. If the topic access is allowed, the message is processed. If the topic access is not allowed, the message is rejected.

Authorizing the publishing of a message and/or a subscription (or any other transmission of a message) as described herein has numerous advantages, including but not limited to improving the utilization of resources (e.g., computing, memory, and/or network resources) of computing devices. For instance, in accordance with disclosed techniques, a message broker may avoid message processing to unauthorized topic locations, and ensure that a message is published only to permitted locations, thereby preventing the exposure of data to entities that should not have access. Performing an access check in such a manner therefore can reduce the utilization of computing resources (e.g., by avoiding the need to process messages that are not authorized for publishing to a given topic), memory resources (e.g., by causing messages to be published and/or saved only to permitted locations, rather than unauthorized locations), and network resources (e.g., by avoiding the need to unnecessarily transmit messages over a network that need not be published), thereby conserving such resources.

Further, disclosed techniques may enable improvements to the security of the computing devices generally, as well as the security of a network coupled thereto. For instance, by preventing the transmission (e.g., publishing of a message to a topic or transmitting a message to a subscriber of a topic filter) of a message that is not authorized for such transmission, techniques described herein may maintain appropriate access controls on data which may contain private, sensitive, or otherwise non-public information. As a result, improvements to data security may be achieved, which can reduce the risk of a compromise of data that is stored on and/or transmitted by a computing device.

As such, example embodiments are described herein that are directed to techniques for authorizing the transmission of one or more messages. For instance, FIG. 1 shows a block diagram of an attribute based access control (ABAC) authorization system 100 for a message broker, in accordance with an example embodiment. As shown in FIG. 1, system 100 includes a client 102, a wrapper 106, a claims provider 108, a message broker 112, other publishing sources 114, an event hub 116, and a computing device 118. Client 102 includes a message 104. Claims provider 108 includes an attribute list 110. Client 102, wrapper 106, claims provider 108, message broker 112, other publishing sources 114, event hub 116, and computing device 118 may be communicatively coupled by one or more networks or peer-to-peer connections (not shown). An example computing device that may incorporate the functionality of one or more of client 102, wrapper 106, claims provider 108, message broker 112, other publishing sources 114, event hub 116, and computing device 118 (or any subcomponents therein, whether or not illustrated in FIG. 1) is described below in reference to FIG. 7. System 100 may comprise any number of devices, including those illustrated in FIG. 1 and optionally one or more further devices or components not expressly illustrated. System 100 is further described as follows.

A network that couples any of the components shown in FIG. 1 may include one or more of a local area network (LAN), a wide area network (WAN), a personal area network (PAN), a combination of communication networks, such as the Internet, and/or a virtual network. In example implementations, client 102, wrapper 106, claims provider 108, message broker 112, other publishing sources 114, event hub 116, and computing device 118 communicate via the network. In an implementation, any one or more of client 102, wrapper 106, claims provider 108, message broker 112, other publishing sources 114, event hub 116, and computing device 118 may communicate over the network via one or more application programming interfaces (API) and/or according to other interfaces and/or techniques. Client 102, wrapper 106, claims provider 108, message broker 112, other publishing sources 114, event hub 116, and computing device 118 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. In some other examples, any one or more of client 102, wrapper 106, claims provider 108, message broker 112, other publishing sources 114, event hub 116, and computing device 118 may be coupled by one or more peer-to-peer connections that enables wired and/or wireless communications with each other. Further examples of network interfaces are described elsewhere herein.

Client 102 may include one or more computing devices of one or more users (e.g., individual users, family users, enterprise users, governmental users, etc.) that each comprise one or more applications, operating systems, virtual machines, storage devices, etc. that may transmit and/or receive message 104. Client 102 may be any type of stationary or mobile device, such as an Internet of Things (IoT) device. As used herein, an IoT device comprises any computing device that may connect to another computing device or system via a connection to a network (e.g., the Internet) or a peer-to-peer connection to send and receive data. In some implementations, an IoT device includes one or more physical networking components for wirelessly connecting to the Internet for sending and receiving data (e.g., messages). Examples of client 102 include a vehicle (e.g., an electric vehicle) comprising computing functionality, a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), a camera, a home assistant device, a smart home device, an appliance, or other type of stationary or mobile device with network connectivity capabilities. Client 102 is not limited to a physical machine, but may include other types of machines or nodes, such as a virtual machine. In some implementations, client 102 may comprise one or more sensors for capturing information in or around client 102, including but not limited to a temperature sensor, a pressure sensor, an accelerometer, a gyroscope, an orientation sensor, an image sensor, a biometric sensor, or a global positioning system (GPS) sensor. Client 102 may interface with other components illustrated in FIG. 1 through APIs and/or by other mechanisms.

Message 104 includes any set of information that is generated at client 102 for transmission to another entity (e.g., message broker 112) or information that is generated outside of client 102 (e.g., received 132 from other publishing sources 114) for transmission to client 102. In some implementations, message 104 may include a publish or a subscribe message in a publish-subscribe messaging environment. For instance, message 104 generated at client 102 (e.g., a publish message) may include information relating to conditions local to client 102 (e.g., a condition, such as a weather condition, based on sensor data at client 102). In other examples, message 104 generated outside of client 102 may include any information relating to a topic for which client 102 has subscribed, such as alerts relating to an environment in which client 102 is present (e.g., weather alerts). Message 104 may be associated with a message topic (e.g., a topic may be embedded within or along with message 104). The topic may correspond to a grouping of similar types of message (e.g., similar in content, publishing source, location data, associated user, etc.). In examples, messages received by client 102 may be generated by any device, including but not limited to other clients, other publishing sources 114 (which may include any external device or service that generates a messages), or any other device or service not expressly illustrated in FIG. 1. These examples are only illustrative, and it is understood that message 104 may include any type of information generated by client 102 and/or by other publishing sources.

Wrapper 106 may be configured to receive 124 information from client 102 and claims provider 108, and provide such information to message broker 112. For instance, wrapper 106 may receive message 104 from client 102 and attribute list 110 from claims provider 108. Upon receiving such information, wrapper 106 may wrap or assemble the information in a wrapper and provide 126 the wrapper to message broker 112. In examples, wrapper 106 may also receive a topic associated with message 104. For instance, when message 104 is generated local to client 102, client 102 may assign the message to a given topic to which the message pertains from a plurality of topics (e.g., a message comprising engine sensor data may be tagged with an "engine" topic associated with the particular client). Accordingly, in examples, wrapper 106 may transmit to message broker 112 a collection or wrapper of information that includes message 104, a topic associated with message 104, and attribute list 110. It is noted that wrapper 106 need not be a separate component in some implementations. Rather, the functionality of wrapper 106, in whole or in part, may be incorporated into message broker 112. For instance, message broker 112 may be configured to accept message 104 (and an associated topic) from client 102, and message broker 112 may then communicate with claims provider 108 to obtain attribute list 110.

In embodiments where wrapper 106 is present, wrapper 106 may comprise a service that is used in tandem with message broker 112. For instance, wrapper 106 may be responsible for wrapping message broker 112 such that client 102 communicates with wrapper 106 rather than directly communicating with message broker 112. Client 102 may be configured (e.g., programmed) to communicate with a particular endpoint. Rather than configuring client 102 to communicate with an endpoint (e.g., a uniform resource locator (URL), a network address, etc.) associated with message broker 112, client 102 may instead be configured to communicate with an endpoint associated with wrapper 106. In other words, in an example system, the endpoint associated with wrapper 112 is exposed to the clients, while the endpoint associated with message broker 112 is not. In this manner, client 102 may transmit messages and other information discussed herein directly to wrapper 106, rather than to message broker 112.

Ensuring that communications flow directly to wrapper 106 (rather than to message broker 112) may be enforced in various ways. In one implementation, network isolation of message broker 112 may performed such that callers (e.g., clients) other than wrapper 106 (and/or claims provider 108 in some implementations) cannot reach message broker 112. Such a technique may be carried out, for instance, by configuring message broker 112 to be on a private network. In another implementation, authorization to message broker 112 may be locked down such that callers other than wrapper 106 (and/or claims provider 108) are not able to use message broker 112. For example, message broker 112 may enforce an authentication method made available and used only by wrapper 106 and/or claims provider 108. Examples include, but are not limited to, providing a certificate available only to the wrapper or claims provider, a token signed by an authority that will only grant it to wrapper 106 and/or claims provider 108, and no other entities, credentials (e.g., username/password) only known to wrapper 106 and/or claims provider 108, etc. Any of the foregoing techniques may be implemented individually, or in combination (e.g., layered) to further enhance security (e.g., defense-in-depth).

Attribute list 110 may be stored in claims provider 108. Claims provider 108 may comprise a data store that contains information relating to client 102, users of client 102, services offered, purchased, and/or subscribed to by client 102, or any other information associated with client 102. Claims provider 108 is not limited to any particular type of entity or source, and may include any data store for storing and/or providing attribute list 110.

Attribute list 110 received from claims provider 108 may include one or more claims associated with client 102. For instance, a claim may comprise an attribute associated with client 102. In implementations, each attribute may include a set of data elements, such as a key and an associated value (i.e., a key-value pair). In one example, the key may define a data set, and the value may define the content of the data set. Claims provider 108 and/or message broker 112 may operate in an early-binding system or a late-binding system. In early-binding implementations, for instance, each key-value pair may identify a topic to which client 102 may publish and/or a topic (which may include one or more wildcards) to which client 102 has subscribed. In late-binding implementations, attribute list 110 may be processed into pre-configured topics that may be used by message broker 112 in performing an authorization check. Attribute list 110 may include any number of attributes (or key-value pairs) for client 102 (and/or other clients not illustrated in FIG. 1).

In some implementations, attribute list 110 may be cached to a data store that is local to wrapper 106 and/or message broker 112 such that attribute list 110 need not be obtained each time a new connection is established, a new message is received, or a new subscription is received. Rather, in such instances, wrapper 106 and/or message broker 112 may access the attribute list stored in the local store and determine whether the publishing of a message and/or a subscription specified by a topic filter is authorized, in accordance with disclosed techniques. In this manner, wrapper 106 or message broker 112 may determine whether attribute list 110 for a given client is present in a local cache when a new message or a subscription is received, rather than obtaining the attribute list from a claims provider each time.

In some implementations, attribute list 110 may also comprise an expiration date or a time to live (TTL) lifespan. For instance, attribute list 110 stored in a local cache may be automatically deleted or discarded upon expiration of the TTL. In another implementation, upon expiration of the TTL of attribute list 110, an updated attribute list (with an updated TTL) may be automatically obtained to replace the expired one in the local cache. The TTL may be specified for the entire list of attributes and/or one or more individual claims included therein (e.g., a TTL for any one or more of the topics or topic filters included in attribute list 110). The TTL may be implemented in any suitable fashion, such as by specifying each TTL as a key-value pair or in any other manner.

Message broker 112 may be configured to receive message 104, a topic associated with message 104, and attribute list 110. In examples, message broker 112 determines whether message 104 is allowed to be published to the topic identified by the topic associated with the message. For instance, if message 104 is tagged with an "engine" topic associated with client 102, message broker 112 may determine whether message 104 may be published to the "engine" topic associated with client 102. Message broker 112 may determine whether such an action is permitted in various ways. For example, message broker 112 may perform an access check to determine whether attribute list 110 identifies the topic associated with message 104 as a topic for which client 102 may publish messages. If attribute list 110 indicates that client 102 is authorized to publish a message to this topic, message broker 112 may publish the message. If attribute list 110 does not indicate that client 102 is authorized to publish a message to this topic, message broker 112 may reject or discard the message. In this manner, message broker 112 may perform an attribute-based access control in determining whether to authorize or deny publishing of message 104. For instance, message broker 112 may use the attribute list and a topic extracted from a message to ensure that a message received from a particular client is published only to an authorized location (e.g., topic) for that client, thereby avoiding access control failures (e.g., publishing to an unauthorized space).

While the above example is described with respect to publishing a message received from client 102, similar techniques may be employed for messages to which client 102 has subscribed. For instance, when a message arrives at message broker 112 for a given topic, message broker 112 may identify, based on one or more claims in attribute list 110, whether client 102 is authorized to receive messages a topic filter that includes the topic associated with the message (e.g., a topic filter that has a wildcard that encompasses the topic). If attribute list 110 indicates that client 102 is authorized to subscribe to messages specified by the topic filter that includes the topic associated with the message, message broker 112 may authorize the message to be transmitted to client 102. In other words, attribute list 110 may contain information that indicates which topic filters for which client 102 is permitted to subscribe, irrespective of whether client 102 has actually subscribed to receiving messages for such topics or topic filters.

In some examples, message broker 112 may perform an access check as described herein (e.g., based on attribute list 110) at the time client 102 subscribes to a topic (e.g., when the client sets up or configures a subscription specifying a topic filter in order to receive messages in the future). For instance, when client device 102 subscribes to receiving messages, the initiation of the subscription (or subscriptions) may comprise transmitting one or more subscribe packets to wrapper 106 (or message broker 112, if wrapper 106 is not present). Each subscribe packet may identify one or more topic filters for which client 102 is subscribing. Any one or more of the topic filters specified in the client's subscription may or may not be authorized. In such instances, message broker 112 may determine, at the time of the subscription (e.g., the initiation or configuration of the subscription, which may be prior to any messages falling within the scope of the topic filter specified in the subscription being received by the broker), whether client 102 is authorized to subscribe to receiving messages falling within the scope of the specified topic filter (in other words, whether the subscription specifying the topic filter is authorized for client 102) in accordance with the disclosed techniques. If message broker 112 determines that client 102 is authorized to subscribe to receiving messages within the scope of the topic filter, message broker 112 may process messages falling within the scope of that topic filter and transmit those messages to client 102. If message broker 112 determines that client 102 is not authorized to subscribe to receiving messages within the scope of the topic filter, message broker 112 may prevent those messages from being sent to client device 102 (e.g., by rejecting messages for transmission, causing the subscription to be rejected or cancelled, etc.).

In other examples, message broker 112 may perform an access check (e.g., whether the subscription specifying the topic filter is authorized for client 102) in response to one or more other triggers. For instance, such an access check as described herein may be performed at delivery time (e.g., when message broker 112 receives one or more new messages falling within the scope of the specified topic filter specified by the client's subscription). In yet other examples, message broker 112 may perform an authorization check at either time of client device 102 subscribes to receiving messages for a topic filter (e.g., in response to the broker receiving a subscription specifying the topic filter), at the time a message may be delivered to client device 102, or both. In this manner, message broker 112 may ensure that one or more claims associated with client 102 have not changed since the time client 102 has subscribed to receiving messages for a given topic filter. In yet other examples, message broker 112 may be configured to determine whether the client's subscription specifying the topic filter is authorized for the IoT device in response to receiving an updated version of a list of attributes from claims provider 108.

In addition, while illustrative examples are described with respect to messages published or subscribed by client 102, the disclosed techniques may also be applied to messages published by or subscribed by any other entity (e.g., other publishing sources 114, other devices on the cloud that publish or subscribe to messages, etc.). Further details and examples regarding the operation of message broker 112 will be discussed below.

In some implementations, message broker 112 may publish 128 one or more messages to event hub 116. It is noted that publishing the message(s) to event hub 116 may comprise any suitable technique for providing or otherwise transmitting the message(s) to event hub 116 and is not limited to publishing a message as that term is used herein. Event hub 116 may comprise a data ingestion service configured to receive messages (and/or any other information) and transmit 130 one or more of such messages to other devices, including client 102 and/or computing device 118. Computing device 118 may be any type of stationary or mobile device, similar to client 102 as described above. For instance, computing device 118 may be configured to receive message 104 that is generated local to client 102 (e.g., an alert generated at client 102).

Implementations are not limited to the illustrative arrangement shown in FIG. 1. For instance, client 102, wrapper 106, claims provider 108, message broker 112, other publishing sources 114, event hub 116, and computing device 118 may not be separate or remotely located from each other. In some examples, any one or more of client 102, wrapper 106, claims provider 108, message broker 112, other publishing sources 114, event hub 116, and computing device 118 (or any subcomponents therein) may be part of or accessible via the same computing device or distributed across a plurality of devices. Furthermore, each of the components illustrated in FIG. 1 need not be present in all implementations. For example, functionalities of wrapper 106 (in whole or in part) may be implemented as part of message broker 112, such that client 102 may send message 104 (and its associated topic) directly to message broker 112, and/or message broker 112 may obtain attribute list 110 from claims provider 108. Furthermore, message broker 112 may publish messages directly to one or more other devices without event hub 116. System 100 may also comprise any number of additional devices not shown in FIG. 1 that may be coupled in any manner in accordance with the disclosed techniques.

The following descriptions are intended to further describe the above example embodiments and describe additional example embodiments in which implementations may be provided. Furthermore, the descriptions that follow explain additional context for such example embodiments and details relating to the implementations. The descriptions that follow are intended to illustrate various aspects and/or benefits that may be achieved based on techniques described herein, and are not intended to be limiting. Accordingly, while additional example embodiments are described, the features described below are not required in all implementations.

In example access control embodiments, techniques may be implemented by or in one or more of client 102, wrapper 106, claims provider 108, message broker 112, other publishing sources 114, event hub 116, and computing device 118 (or any of their subcomponents). Other structural and operational implementations will be apparent to persons skilled in the relevant art(s) based on the following discussion.

In an example implementation, an efficient Attribute Based Access Control (ABAC) authorization is provided for a Message Queueing Telemetry Transport (MQTT) broker. Message broker 112 is an example of such an MQTT broker. In accordance with disclosed techniques, a per-message authorization access check is provided across topics in an MQTT environment. Optimizations include access check on initial MQTT connect and supporting change in authorized topics.

Sources of incoming messages may be from devices within a larger device, such as a connected vehicle (e.g., an electrical vehicle (EV)). Message 104 is an example of such a message that may originate from client 102. Once the messages arrive in a service (such as the broker itself, a protocol gateway, or some other component that provides endpoint termination of a secured channel from the vehicle), a series of validation steps may be executed. In one step of the validation, a list of attributes (e.g., attribute list 110) associated with the vehicle is obtained by the broker (e.g., directly or indirectly from claims provider 108). In some implementations, a user identity associated with the message is also obtained from the vehicle. These attributes include a list of topics (e.g., MQTT topics) that the vehicle is authorized to publish (PUB) or to which the vehicle is authorized to subscribe (SUB). As discussed above, techniques are not limited to early-binding systems, and may also be implemented in late-binding authorization systems. In examples, these topics may include wildcards. For instance, a subscribe topic may comprise a predetermined wildcard character (e.g., a "+" character) that enables a subscription to a broad category of topics. In some implementations, the list of topics may be compact (e.g., in environments where client 102 is a connected vehicle). Such compactness may limit the number of topics (or use of wildcards) needed to be enumerated in the access control attribute.

An attribute may comprise a key value pair. In some implementations, a string is used for the key and a multi-valued string (list) is utilized as the value. While examples are described herein as key value pairs, any other structure, formatting, or arrangement may be utilized. An illustrative example attribute is described as Key: "Key1" and Value: ["value1", "value2", etc.]. In one example, at least two attributes may be utilized with a first attribute relating to topics for which the vehicle may publish, and a second attribute relating to topics to which the vehicle may subscribe. In examples, the key indicates whether publication of by the IoT device (e.g., client 102) is allowed, and the associated value identifies one or more topics associated with the key (i.e., names of topics to which client 102 is allowed to publish). In other examples, the key indicates whether subscription by the IoT device is allowed, and the associated value identifies one or more topic filters associated with the key (e.g., topic filters for which the IoT device is authorized to receive messages). For instance, two such attributes may be used with Key names of "PUB_allowed" and "SUB_allowed" for the list of topics with permission to access for publish and subscribe respectively. An example attribute list for MQTT access control for a connected vehicle "vehicle1" is provide below:

Key: "PUB_allowed"
Value: ["vehicle1/engine", "vehicle1/cabin"']
Key: "SUB_allowed"
Value: ["weatheralert/northwest"]

Techniques are not limited to the illustrative structure described above for storing attributes. In another example, such as where overlap exists between the set of topics permitted for a pub and topic filters for sub, attribute list 110 may be configured to more compactly describe such relationships and therefore be advantageous. An example of attribute list in accordance with such techniques is as follows:

Key: "vehicle1/engine"
Value: ["pub"]
Key: "vehicle1/cabin"
Value: ["pub"]
Key: "weatheralert/northwest"
Value: ["sub"]

In another implementation, additional compactness may be obtained in attribute list 110 as follows:

Key: "vehicle1/cabin"
Value: ["pub", "sub"]

Such techniques are intended to be illustrative only, and it should be understood that other suitable formats, structures, and/or arrangements are possible.

In examples, when client 102 connects to wrapper 106 (or directly to message broker 112), client 102 provides authentication information that uniquely identifies and/or authenticates the client and/or an individual (e.g., a driver or passenger) associated with the client. Once such authentication information is received, a secure connection (e.g., an MQTT connection) may be established, such as a connection in accordance with a Mutual Transport Layer Security (mTLS) protocol. When such a connection is established between client 102 and wrapper 106 (or message broker 112), the above two attributes (in addition to others) may be passed along for transmission to message broker 112. In some implementations, wrapper 106 (or message broker 112 in some embodiments where wrapper 106 is not present)

identifies the client and/or individual associated with the client by a client identifier (e.g., "vehicle1") (and/or any other identifiers to identify the individual) to claims provider 108 based on the authentication information, and obtains from claims provider 108 attribute list 110 associated with the client identifier (and/or any other identifiers). Attribute list 110 may comprise a list of attributes specific to the client identifier and/or any other identifiers (e.g., an identifier of an induvial operating client 102).

When any subsequent publish or subscribe messages are sent within this connection, message broker 112 may be configured to perform an access check (e.g., an "Access-Check( )" method) on the message. In examples, the access check may be performed by extracting the topic specified in the publish or subscribe message and then checking whether this extracted topic is present on the list of topics (e.g., a list of allowed topics) provided in attribute list 110. If the extracted topic is present, the access check returns TRUE and the message is processed (e.g., published to an appropriate space, transmitted as a subscribed message, etc.). If the extracted topic is not in the list topics (e.g., the allowed list), the access check returns FALSE and the message is rejected. Similarly, where wildcards are present, message broker 112 may be configured to apply appropriate messaging protocol (e.g., MQTT) semantics to determine whether the extracted topic should be processed or rejected.

In some implementations, updates to the list of allowed topics may be provided. To allow for updates to the list of allowed topics over time (e.g., if a new functionality is to be enabled or permitted in client 102, such as a new functionality of a vehicle), message broker 112 may provide for a control signal where the MQTT connection (e.g., the connection between client 102 and wrapper 106 or message broker 112) will be terminated for the client (e.g., a specified vehicle device). As the list of allowed topics is provided to and processed on MQTT connection establishment, a new topic list (e.g., an updated version of attribute list 110) can be provided to message broker 112 from claims provider 108 via a control signal received by the message broker, where the new topic list is then utilized in subsequent MQTT access check calls. In other words, message broker 112 may determine (or re-determine) whether client 102 is authorized to subscribe to receiving messages for a topic filter or publish to a topic in response to, or after, receiving an updated list of attributes from claims provider 108.

One or more other or additional mechanisms may be utilized to update or refresh the list of allowed topics for a client's (e.g., a vehicle device's) MQTT connection. One example is providing a new list of allowed topics (in the form of attributes) on a subsequent MQTT message from claims provider 108 to wrapper 106 or message broker 112. The new list would then update the topic allowed list. In such an example, the updated list of allowed topics would be reprocessed and an access check may be performed for subsequent subscribe or publish messages to determine whether the extracted topic for the message is in the updated list of allowed topics.

In an example, the list of attributes is provided by claims provider 108 which exposes an endpoint for which a request specifies a device and optional user. The device may be specified in the form of a device identifier (e.g., a DeviceId), and the user may be specified in the form of a user identifier (e.g., a UserId). The device may be mapped to a specific client (e.g., a vehicle) in the form of a client identifier (e.g., a VehicleId). Claims provider 108 may return the list of attributes based on the request.

In this manner, an efficient access control may be provided for message broker 112 (e.g., an MQTT broker) based on attributes. For instance, in accordance with disclosed techniques, access control data may be provided in an MQTT initial connection and then efficiently processed and/or managed by message broker 112 to determine whether incoming messages should be processed. Techniques disclosed herein may be scaled out to environments comprising tens, hundreds, thousands, millions, or more, of client devices, such as IoT devices (e.g., vehicles, appliances, etc.) or other devices that may publish and/or receive messages.

The disclosed techniques provide numerous benefits and advantages, including but not limited to a highly efficient, fine-grained authorization capability based on attributes provided to a message broker, the ability scale to a large number of devices with a per-device authorization enforcement, attribute-based access control flexibility to message brokers, the ability to update and/or refresh authorization access to existing connections (e.g., MQTT connections), and integration of access control decision and enforcement at the message broker that controls resources being access controlled.

Figure 2:
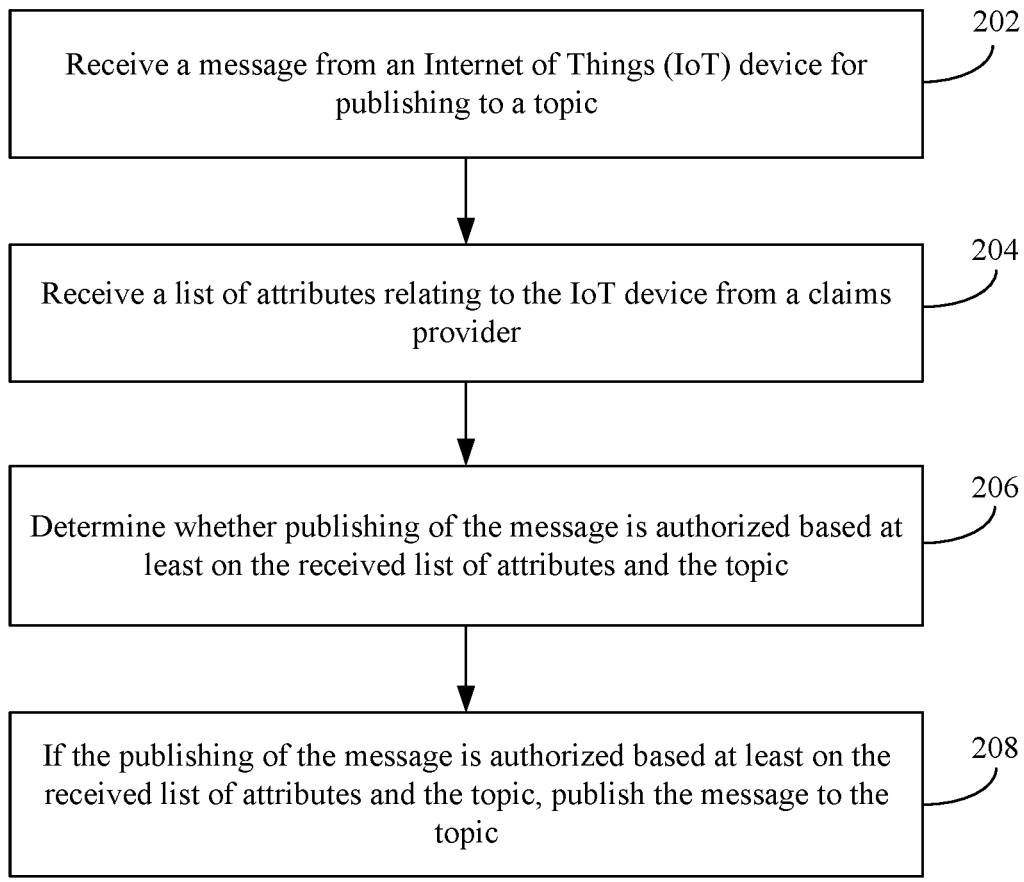
FIG. 2 shows a flowchart of a method for authorizing the publishing of a message, in accordance with an example embodiment.

Message broker 112 may operate in various ways to authorize the transmission of a message. For instance, message broker 112 may operate according to FIG. 2. FIG. 2 shows a flowchart 200 of a method for authorizing the publishing of a message, in accordance with an example embodiment. For illustrative purposes, flowchart 200 and message broker 112 are described as follows with respect to FIG. 1. While example embodiments are described with respect to components of system 100 and flowchart 200, these examples are illustrative.

Flowchart 200 begins with step 202. In step 202, a message is received from an IoT device for publishing to a topic. For instance, with reference to FIG. 1, message broker 112 may be configured to receive message 104 from client 102 which may comprise an IoT device. Message 104 may be designated for publishing to any topic, and may include an identification of the associated topic.

In step 204, a list of attributes relating to the IoT device is received from a claims provider. For instance, with reference to FIG. 1, message broker 112 may be configured to receive attribute list 110 from claims provider 108, where attribute list 110 is related to client 102. As described herein, attribute list 110 may include one or more claims associated with client 102, such as an identification of one or more topics to which client 102 is authorized to publish a message and/or one or more topic filters for which client 102 is authorized to receive messages.

In step 206, a determination is made whether publishing of the message is authorized based at least on the received list of attributes and the topic. For instance, with reference to FIG. 1, message broker 112 may be configured to determine whether publishing of message 104 is authorized based at least on attribute list 110 received from claims provider 108 and the topic associated with message 104. For example, message broker may make such a determination by determining whether the topic associated with the message is present in a claim of attribute list 110 that indicates that client 104 is authorized to published messages to the associated topic.

In step 208, if the publishing of the message is authorized based at least on the received list of attributes and the topic, the message is published to the topic. For instance, with reference to FIG. 1, message broker 112 may be configured to process message 104 (e.g., publish the message to the topic) if it is determined that publishing of the message is authorized based at least on attribute list 110 and the topic associated with message 104. Publishing of message 104 may take any form, such as by providing message 104 to event hub 116, providing the message to computing device 118, or providing the message to any other storage or computing device. When publishing message 104, message broker 112 may publish the message to the associated topic (e.g., by publishing the message along with an indication of the associated topic, storing the message in a bucket or category of messages associated with the associated topic, etc.).

As discussed above, message broker 112 may be configured to reject the publication of a message. For instance, FIG. 3 shows a flowchart 300 of a method for rejecting a message for publication, in accordance with an example embodiment. In an implementation, the method of flowchart 300 may be implemented by message broker 112. FIG. 3 is described with continued reference to FIG. 1. Other structural and operational implementations will be apparent to persons skilled in the relevant art(s) based on the following discussion regarding flowchart 300 and system 100 of FIG. 1.

Flowchart 300 begins with step 302. In step 302, the message is rejected for publication if publishing of the message is not authorized based at least on the received list of attributes and the topic. For instance, with reference to FIG. 1, message broker 112 may be configured to reject message 104 for publication if publication of message 104 is not authorized based at least on attribute list 110 and the topic associated with message 104. Publication of message 104 may not be authorized, for example, where the topic associated with message 104 is not identified in any of the claims included in attribute list 110 as a topic to which client 102 may publish messages. In such instances, message broker 112 may determine that publication of the messages to the associated topic is not authorized, and reject the message for publication to this topic.

As discussed above, message broker 112 may be configured to receive attribute list 110 from wrapper 106. For instance, FIG. 4 shows a flowchart 400 of a method for receiving a list of attributes from a wrapper, in accordance with an example embodiment. In an implementation, the method of flowchart 400 may be implemented by message broker 112. FIG. 4 is described with continued reference to FIG. 1. Other structural and operational implementations will be apparent to persons skilled in the relevant art(s) based on the following discussion regarding flowchart 400 and system 100 of FIG. 1.

Flowchart 400 begins with step 402. In step 402, the list of attributes is received from a wrapper that obtains the list of attributes from the claims provider. For instance, with reference to FIG. 1, message broker 112 may be configured to receive attribute list 110 from wrapper 106, where wrapper 106 obtains attribute list 110 from claims provider 108. In such examples, client 102 may be configured to communicate 122 with wrapper 106 (e.g., initialize a communication channel in which message 104 and the associated topic is provided to wrapper 106). Wrapper 106 may obtain attribute list 110 from claims provider 108 based on an identification of client 102, and provide attribute list 110, message 104, and the topic associated with message 104 to message broker 112. In some implementations, wrapper 106 may obtain attribute list 110 from a local store (e.g., a cache) where attribute list 110 was previously obtained from claims provider 108.

Such an example is only illustrative, and example embodiments include message broker 112 receiving attribute list 110 from claims provider 108 and receiving message 104 and the associated topic from client 102 without wrapper 106. Accordingly, while examples are described in which wrapper 106 may be implemented, any one or more features of wrapper 106 may be implemented within or as part of message broker 112.

Figure 5:
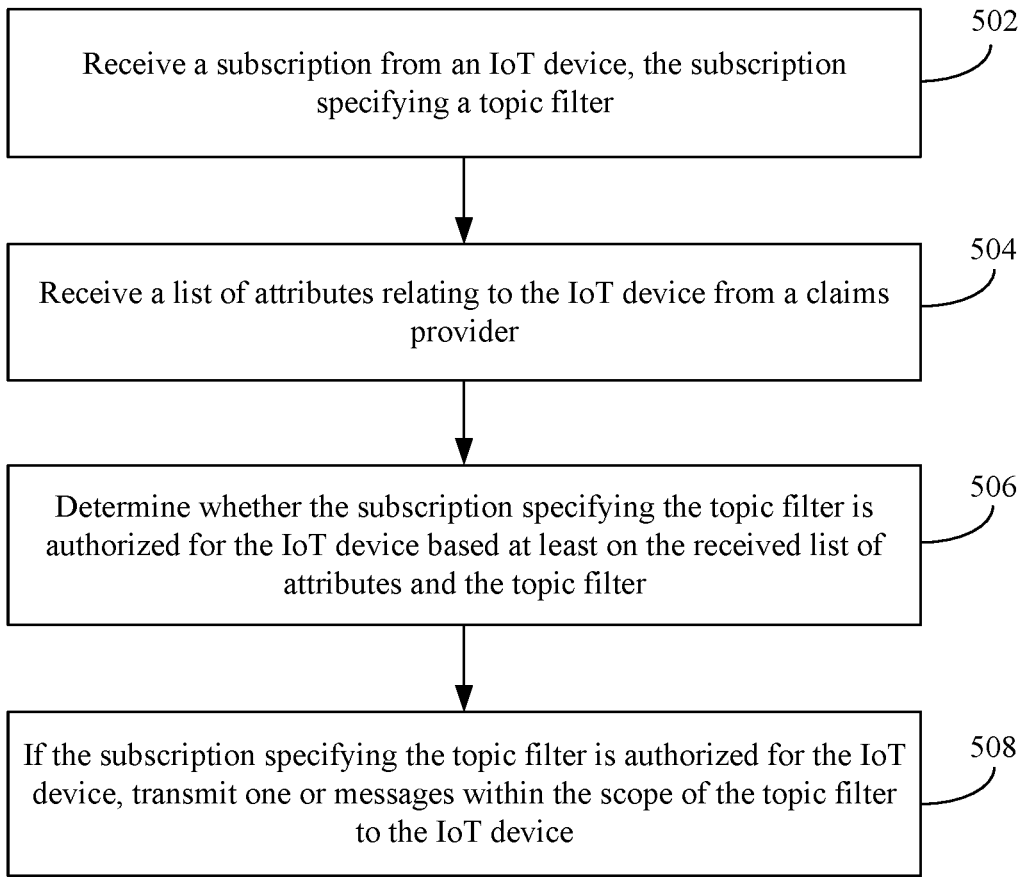
FIG. 5 shows a flowchart of a method for authorizing a subscription from an IoT device, in accordance with an example embodiment.

As discussed above, message broker 112 may be configured to authorize message subscriptions specifying a topic filter. For instance, FIG. 5 shows a flowchart 500 of a method for authorizing a subscription from an IoT device, in accordance with an example embodiment. In an implementation, the method of flowchart 500 may be implemented by message broker 112. FIG. 5 is described with continued reference to FIG. 1. Other structural and operational implementations will be apparent to persons skilled in the relevant art(s) based on the following discussion regarding flowchart 500 and system 100 of FIG. 1.

Flowchart 500 begins with step 502. In step 502, a subscription is received form an IoT device, where the subscription specifies a topic filter. For instance, with reference to FIG. 1, message broker 112 may be configured to receive a packet from client 102 comprising a subscription from client 102, where the subscription specifies a topic filter for which client 102 is attempting to receiving messages. As described herein, the topic filter may identify a topic and/or may include any one or more wildcard characters configured to define a broader set or categories of topics. In a similar manner as described above, message broker 112 may receive the subscription from wrapper 106, or directly from client 102 (e.g., without wrapper 106).

In step 504, a list of attributes relating to the IoT device is received from a claims provider. For instance, with reference to FIG. 1, message broker 112 may be configured to receive attribute list 110 from claims provider 108. In examples, step 504 may be performed in a similar manner as described above with respect to step 204 of FIG. 2.

In step 506, a determination is made whether the subscription specifying the topic filter is authorized for the IoT device based at least on the received list of attributes and the topic filter. For instance, with reference to FIG. 1, message broker 112 may be configured to determine whether the subscription specifying the topic filter received from client 102 is authorized for client 102, based at least on attribute list 110 and the topic filter. Message broker may make such a determination by determining whether the topic filter specified in the subscription is included within any one or more claims in attribute list 110 that indicates that client 102 is authorized to subscribe to messages for the topic filter.

In step 508, if the subscription specifying the topic filter is authorized for the IoT device, one or messages within the scope of the topic filter are transmitted to the IoT device. For instance, with reference to FIG. 1, if the subscription specifying the topic filter received from client 102 is authorized for client 102, one or more messages that may be received at a later time that fall within the scope of the topic filter are transmitted to client 102. In other words, where the subscription is authorized for client 102, message broker 112 may process subsequent messages falling within the scope of the subscription for transmission to client 102.

In some implementations, attribute list 110 received by message broker 112 may be used to authorize the transmission of messages to and/or from client 102, such as by combining any one or more steps of the flowcharts described herein. For instance, message broker 112 may be configured to receive, from client 102, a first message for publishing to a topic. Message broker may determine whether publishing of the first message is authorized based at least on the topic and attribute list 110 relating to client 102 received from claims provider 108. If the publishing of the message is authorized based at least on attribute list 110 and the topic, message broker 112 may publish the first message to the topic. Message broker 112 may also receive, from client 102, a subscription that specifies a topic filter, and determine whether the subscription is authorized for client 102 based at least on the topic filter and attribute list 110. If the subscription specifying the topic filter is authorized for client 102, message broker 112 may transmit a second message within the scope of the topic filter to client 102.

Figure 6:
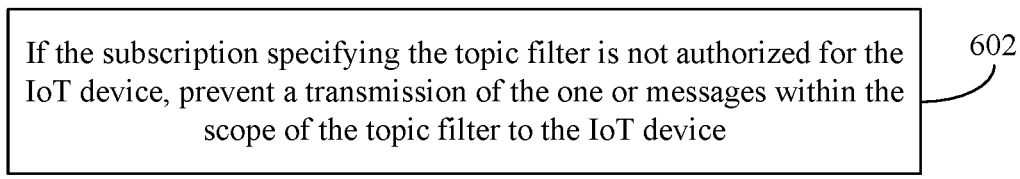
FIG. 6 shows a flowchart of a method for preventing a transmission of messages within the scope of a topic filter, in accordance with an example embodiment.

As discussed above, message broker 112 may be configured to prevent messages from being transmitted to a device. For instance, FIG. 6 shows a flowchart 600 of a method for preventing a transmission of messages within the scope of a topic filter, in accordance with an example embodiment. In an implementation, the method of flowchart 600 may be implemented by message broker 112. FIG. 6 is described with continued reference to FIG. 1. Other structural and operational implementations will be apparent to persons skilled in the relevant art(s) based on the following discussion regarding flowchart 600 and system 100 of FIG. 1.

Flowchart 600 begins with step 602. In step 602, if the subscription specifying the topic filter is not authorized for the IoT device, a transmission of the one or messages within the scope of the topic filter is prevented. For instance, with reference to FIG. 1, if message broker 112 determines that the subscription specifying the topic filter is not authorized for client 102, message broker 112 may prevent the transmission of one or more messages within the scope of the topic filter specified in the subscription to client 102. As described herein, in one example, message broker 112 may be configured to reject or cause the subscription to be canceled altogether (e.g., at the time the subscription is initiated). In other instances, message broker 112 may be configured to prevent the transmission of messages at a message delivery time (e.g., when a message falling within the scope of the topic filter is received at message broker 112).

III. Example Computer System Implementation

Client 102, wrapper 106, claims provider 108, message broker 112, other publishing sources 114, event hub 116, computing device 118, flowchart 200, flowchart 300, flowchart 400, flowchart 500, and/or flowchart 600 may be implemented in hardware, or hardware combined with one or both of software and/or firmware. For example, client 102, wrapper 106, claims provider 108, message broker 112, other publishing sources 114, event hub 116, computing device 118, flowchart 200, flowchart 300, flowchart 400, flowchart 500, and/or flowchart 600 may be implemented as computer program code/instructions configured to be executed in one or more processors and stored in a computer readable storage medium.

Alternatively, client 102, wrapper 106, claims provider 108, message broker 112, other publishing sources 114, event hub 116, computing device 118, flowchart 200, flowchart 300, flowchart 400, flowchart 500, and/or flowchart 600 may be implemented as hardware logic/electrical circuitry.

For instance, in an embodiment, one or more, in any combination, of client 102, wrapper 106, claims provider 108, message broker 112, other publishing sources 114, event hub 116, computing device 118, flowchart 200, flowchart 300, flowchart 400, flowchart 500, and/or flowchart 600 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
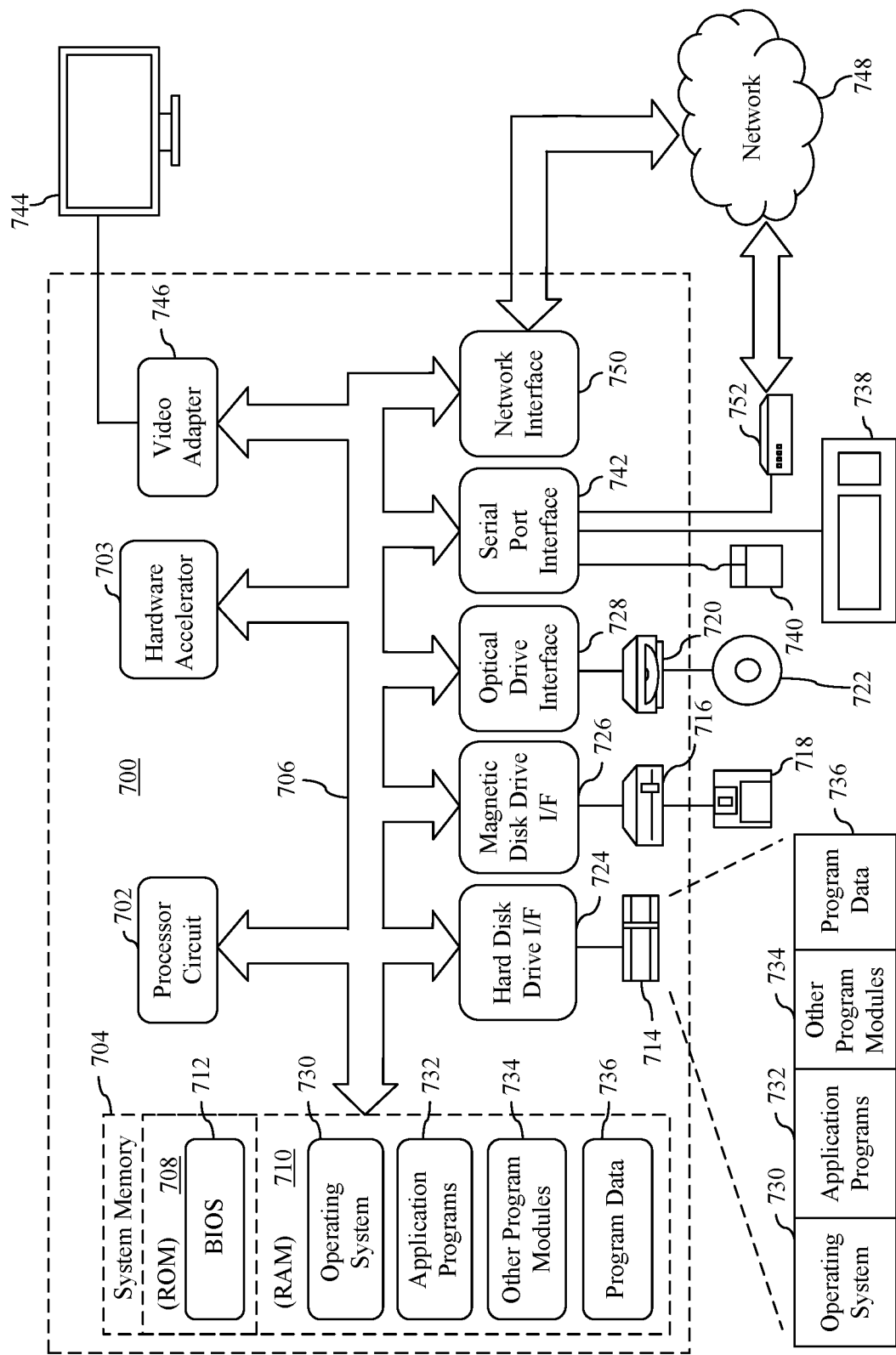
FIG. 7 is a block diagram of an example processor-based computer system that may be used to implement various embodiments.

FIG. 7 depicts an exemplary implementation of a computing device 200 in which embodiments may be implemented. For example, client 102, wrapper 106, claims provider 108, message broker 112, other publishing sources 114, event hub 116, computing device 118, flowchart 200, flowchart 300, flowchart 400, flowchart 500, and/or flowchart 600 (and/or any of the steps of flowcharts 200, 300, 400, 500, and/or 600) may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a hardware accelerator 703, a system memory 704, and a bus 706 that couples various system components including system memory 704 to processor circuit 702 and hardware accelerator 703. Processor circuit 702 and/or hardware accelerator 703 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing any of the features of client 102, wrapper 106, claims provider 108, message broker 112, other publishing sources 114, event hub 116, computing device 118, flowchart 200, flowchart 300, flowchart 400, flowchart 500, and/or flowchart 600 and/or further embodiments described herein.

A user may enter commands and information into computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with propagating signals and communication media (do not include propagating signals and communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A system for authorizing publishing of a message from an IoT device is disclosed herein. The system includes: at least one processor circuit; and at least one memory that stores program code configured to be executed by the at least one processor circuit, the program code comprising: a message broker configured to: receive the message from the IoT device for publishing to a topic; receive a list of attributes relating to the IoT device from a claims provider; determine whether publishing of the message is authorized based at least on the received list of attributes and the topic; and if the publishing of the message is authorized based at least on the received list of attributes and the topic, publish the message to the topic.

In one implementation of the foregoing system, the message broker is configured to: reject the message for publication if publishing of the message is not authorized based at least on the received list of attributes and the topic.

In another implementation of the foregoing system, the list of attributes identifies one or more topics to which the IoT device is authorized to publish.

In another implementation of the foregoing system, the list of attributes comprises a key and an associated value, the key indicating whether publication by the IoT device is allowed, and the associated value identifying the one or more topics.

In another implementation of the foregoing system, the list of attributes specifies a TTL for at least one of the list or the one or more topics identified therein.

In another implementation of the foregoing system, the message broker is configured to receive the list of attributes from a wrapper that obtains the list of attributes from the claims provider.

In another implementation of the foregoing system, the message broker is configured to receive a control signal from the claims provider to update the list of attributes.

In another implementation of the foregoing system, the IoT device comprises one of: a vehicle; a sensor; a camera; a wearable device; a home assistant; a smart home device; or an appliance.

A system for authorizing a subscription by an IoT device is disclosed herein. The system includes: at least one processor circuit; and at least one memory that stores program code configured to be executed by the at least one processor circuit, the program code comprising: a message broker configured to: receive the subscription from the IoT device, the subscription specifying a topic filter; receive a list of attributes relating to the IoT device from a claims provider; determine whether the subscription specifying the topic filter is authorized for the IoT device based at least on the received list of attributes and the topic filter; and if the subscription specifying the topic filter is authorized for the IoT device, transmit one or messages within the scope of the topic filter to the IoT device.

In one implementation of the foregoing system, the message broker is configured to: if the subscription specifying the topic filter is not authorized for the IoT device, prevent a transmission of the one or messages within the scope of the topic filter to the IoT device.

In another implementation of the foregoing system, the list of attributes identifies one or more topic filters for which the IoT device is authorized to receive messages.

In another implementation of the foregoing system, the list of attributes comprises a key and an associated value, the key indicating whether subscription by the IoT device is allowed, and the associated value identifying the one or more topic filters.

In another implementation of the foregoing system, the list of attributes specifies a TTL for at least one of the list or the one or more topic filters identified therein.

In another implementation of the foregoing system, the message broker is configured to receive the list of attributes from a wrapper that obtains the list of attributes from the claims provider.

In another implementation of the foregoing system, the IoT device comprises one of: a vehicle; a sensor; a camera; a wearable device; a home assistant; a smart home device; or an appliance.

In another implementation of the foregoing system, the message broker is configured to determine whether the subscription specifying the topic filter is authorized for the IoT device at a time the subscription is initiated.

In another implementation of the foregoing system, the message broker is configured to determine whether the subscription specifying the topic filter is authorized for the IoT device in response to at least one of: receiving the one or more messages falling within the scope of the topic filter, or receiving the list of attributes, wherein the list of attributes comprises an updated list of attributes.

A method for authorizing the transmission of messages involving an IoT device. The method includes: receiving, from the IoT device, a first message for publishing to a topic; determining whether publishing of the first message is authorized based at least on the topic and a list of attributes relating to the IoT device received from a claims provider; if the publishing of the message is authorized based at least on the topic and the list of attributes, publishing the first message to the topic; receiving, from the IoT device, a subscription, the subscription specifying a topic filter; determining whether the subscription specifying the topic filter is authorized for the IoT device based at least on the topic filter and the list of attributes; and if the subscription specifying the topic filter is authorized for the IoT device, transmitting a second message within the scope of the topic filter to the IoT device.

In one implementation of the foregoing method, the list of attributes comprises a first key and a first associated value, and a second key and a second associated value, wherein the first key indicates whether publication by the IoT device is allowed, and the first associated value identifies one or more topics to which the IoT device is authorized to publish, and wherein the second key indicates whether subscription by the IoT device is allowed, and the second associated value identifies one or more topic filters for which the IoT device is authorized to receive messages.

In another implementation of the foregoing method, the method includes receiving the list of attributes from a wrapper that obtains the list of attributes from the claims provider.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system for authorizing publishing of a message from an Internet of Things (IoT) device, the system comprising:
   at least one processor circuit; and
   at least one memory that stores program code configured to be executed by the at least one processor circuit, the program code comprising:
   a message broker configured to:
      receive the message from a wrapper, the message having been sent by the wrapper to the message broker after the wrapper received the message from the IoT device for publishing to a topic;
      receive a list of attributes from the wrapper, the list of attributes relating to the IoT device and having been obtained by the wrapper from a claims provider and including one or more topics to which the IoT device is authorized to publish;
      determine whether publishing of the message is authorized based at least on the received list of attributes and the topic, including determining if the topic is an allowed topic provided in the one or more topics to which the IoT device is authorized to publish; and
      if the publishing of the message is authorized based at least on the received list of attributes and the topic, publish the message to the topic.

2. The system of claim 1, wherein the message broker is configured to:
   reject the message for publication if publishing of the message is not authorized based at least on the received list of attributes and the topic.

3. The system of claim 1, wherein the list of attributes comprises a key and an associated value, the key indicating whether publication by the IoT device is allowed, and the associated value identifying the one or more topics.

4. The system of claim 1, wherein the list of attributes specifies a time-to-live (TTL) for at least one of the list of attributes or the one or more topics identified therein.

5. The system of claim 1, wherein the message broker is configured to receive a control signal from the claims provider to update the list of attributes.

6. The system of claim 1, wherein the IoT device comprises one of:
   a vehicle;
   a sensor;
   a camera;
   a wearable device;
   a home assistant;
   a smart home device; or
   an appliance.

7. A system for authorizing a subscription by an Internet of Things (IoT) device, comprising:
at least one processor circuit; and
at least one memory that stores program code configured to be executed by the at least one processor circuit, the program code comprising:
a message broker configured to:
receive the subscription from a wrapper, the message having been sent by the wrapper to the message broker after the wrapper received the message from the IoT device, the subscription specifying a topic filter;
receive a list of attributes from the wrapper, the list of attributes relating to the IoT device and having been obtained by the wrapper from a claims provider and including one or more topic filters for which the IoT device is authorized to receive messages;
determine whether the subscription specifying the topic filter is authorized for the IoT device based at least on the received list of attributes and the topic filter, including determining if the topic is an allowed topic provided in the one or more topic filters for which the IoT device is authorized to receive messages; and
if the subscription specifying the topic filter is authorized for the IoT device, transmit one or more messages within a scope of the topic filter to the wrapper for delivery to the IoT device.

8. The system of claim 7, wherein the message broker is configured to:
if the subscription specifying the topic filter is not authorized for the IoT device, prevent a transmission of the one or messages within the scope of the topic filter to the wrapper for delivery to the IoT device.

9. The system of claim 7, wherein the list of attributes comprises a key and an associated value, the key indicating whether subscription by the IoT device is allowed, and the associated value identifying the one or more topic filters.

10. The system of claim 9, wherein the list of attributes specifies a time-to-live (TTL) for at least one of the list of attributes or the one or more topic filters identified therein.

11. The system of claim 7, wherein the IoT device comprises one of:
a vehicle;
a sensor;
a camera;
a wearable device;
a home assistant;
a smart home device; or
an appliance.

12. The system of claim 7, wherein the message broker is configured to determine whether the subscription specifying the topic filter is authorized for the IoT device at a time the subscription is initiated.

13. The system of claim 7, wherein the message broker is configured to determine whether the subscription specifying the topic filter is authorized for the IoT device in response to at least one of:
receiving the one or more messages falling within the scope of the topic filter, or
receiving the list of attributes, wherein the list of attributes comprises an updated list of attributes.

14. A method for authorizing transmission of messages involving an Internet of Things (IoT) device, the method comprising:
receiving, from a wrapper, a first message for publishing to a topic, the first message having been sent by the wrapper after the wrapper received the message from the IoT device;
determining whether publishing of the first message is authorized based at least on the topic and a list of attributes received from the wrapper, the list of attributes relating to the IoT device and having been obtained by the wrapper from a claims provider, the list of attributes including one or more topics to which the IoT device is authorized to publish or subscribe;
if the publishing of the message is authorized based at least on the topic and the list of attributes, publishing the first message to the topic;
receiving, from the wrapper, a subscription specifying a topic filter, the subscription having been sent by the wrapper after the wrapper received the subscription from the wrapper;
determining whether the subscription specifying the topic filter is authorized for the IoT device based at least on the topic filter and the list of attributes; and
if the subscription specifying the topic filter is authorized for the IoT device, transmitting a second message within a scope of the topic filter to the wrapper for delivery to the IoT device.

15. The method of claim 14, wherein,
the list of attributes comprises a first key and a first associated value, and a second key and a second associated value,
the first key indicates whether publication by the IoT device is allowed, and the first associated value identifies one or more topics to which the IoT device is authorized to publish, and
the second key indicates whether subscription by the IoT device is allowed, and the second associated value identifies one or more topic filters for which the IoT device is authorized to receive messages.

16. The method of claim 14, wherein the list of attributes identifies the topic in connection with a wildcard.

17. The system of claim 1, wherein the list of attributes identifies the topic in connection with a wildcard.

18. The system of claim 7, wherein the list of attributes identifies a topic in connection with a wildcard.

* * * * *